United States Patent [19]

Perkins et al.

[11] Patent Number: 4,530,812
[45] Date of Patent: Jul. 23, 1985

[54] COMPOSITE COILS FOR TOROIDAL FIELD COILS AND METHOD OF USING SAME

[75] Inventors: Roger G. Perkins, Encinitas; Stephen M. Trujillo, La Jolla, both of Calif.

[73] Assignee: FDX Patents Holding Company, N.V., Curacao, Netherlands Antilles

[21] Appl. No.: 340,237

[22] Filed: Jan. 15, 1982

[51] Int. Cl.³ .................................................. G21B 1/00
[52] U.S. Cl. ...................................... 376/142; 376/133; 336/177
[58] Field of Search ................. 335/216, 217; 336/177, 336/179, 220, 228, DIG. 1; 361/140, 141; 376/133, 142

[56] References Cited

U.S. PATENT DOCUMENTS

| | | | |
|---|---|---|---|
| 3,778,343 | 12/1973 | Coppi et al. | 376/133 |
| 4,066,496 | 1/1978 | Brown | 376/142 |
| 4,174,254 | 11/1979 | Gaines | 376/142 |
| 4,207,451 | 6/1980 | Tudbury | 336/177 |
| 4,268,353 | 5/1981 | Powell et al. | 376/142 |
| 4,277,768 | 7/1981 | Burgeson et al. | 376/142 |

FOREIGN PATENT DOCUMENTS

| | | | |
|---|---|---|---|
| 53-27794 | 3/1978 | Japan | 376/142 |
| 53-72995 | 6/1978 | Japan | 376/142 |

OTHER PUBLICATIONS

IEEE Pub. No. 75 CH1097-5-NPS, (11/75), Proceedings of 6th Sym. on Eng. Pbs. of Fusion Research, pp. 366-369, 496-498, 623-630, Puhn et al.
Powell et al., "DEALS: A Demountable Superconducting Magnet System for Fusion Reactors", Cryogenics, vol. 20, No. 2, (Feb. 1980).
Allinger et al., "High Field Iron Magnets for Operation at Cryogenic Temperatures", IEEE, Trans. on Nuclar Sci., vol. NS-16, #3, Pt. I, (6/'69).
Montgomery, "High-Strength Conductors for Supermagnets", IEEE Spectrum (Aug. 1966).
Starfire ANL/FFP-80-1, vol. I, pp. 9-2 to 9-45-Sep. 1980.
Preliminary Conceptual Design Study of the Riggatron Approach to Fusion Power, Final Rept., vol. I, pp. 23-47.
Metal Engineering Quarterly, Nov. 1972, Taubeublat et al., "A New Copper Alloy with High Strength and Conductivity".
Transactions of the ASM, vol. 59, 1966, McDanels-'-'Electrical Resistivity and Conductivity of Tungsten-Fiber-Reinforced Copper".
Transactions of the Metalurgical Society of AIME, vol. 233, Apr. 1965, McDanels et al., "Analysis of Stress-Strain Behavior of Tungsten-Fiber-Reinforced Copper Composites".
NASA TN D-3530, 1965, Weeton et al., "Fiber-Metal Composite Materials".

Primary Examiner—Sal Cangialosi
Attorney, Agent, or Firm—Schwartz, Jeffery, Schwaab, Mack, Blumenthal & Evans

[57] ABSTRACT

A composite toroidal field (TF) generating means consisting of segmented magnetic coil windings is disclosed. Each coil winding of the TF generating means consists of a copper or copper alloy conductor segment and an aluminum or aluminum alloy conductor segment. The conductor segments are joined at a high strength, low electrical resistance joint and the joint may either be a mechanical or metallurgical one. The use of the aluminum or aluminum alloy conductor segments improves the neutron economy of the reactor with which the TF coil is associated and reduces TF coil nuclear heating and heating gradients, and activation in the TF coils.

42 Claims, 7 Drawing Figures

COMPOSITE COILS FOR TOROIDAL FIELD COILS AND METHOD OF USING SAME

FIELD OF THE INVENTION

The present invention relates generally to composite magnetic coil windings and more particularly to composite magnetic coil windings for use in a tokamak reactor. The present invention also relates generally to toroidal reactors for producing fusion reactions and more particularly to toroidal field coil windings for toroidal reactors where the coil windings are composite members consisting of two or more segments of dissimilar materials. More particularly still the invention relates to segmented toroidal field coil windings for tokamak reactors where the coil windings are made of a copper or copper alloy section and an aluminum or aluminum alloy section.

BACKGROUND OF THE INVENTION

Prior art tokamak fusion reactor (TFR) concepts were directed to large machines with blanket and shield elements positioned in between the plasma fusion region of the TFR and the large superconducting toroidal field (TF) coils. In U.S. Pat. Nos. 4,367,193 and 4,363,775, there is disclosed a small machine with the blanket means positioned external to the normally conducting TF coil assembly. It is known in the art that such blankets can advantageously use the neutrons generated in the fusion plasma to breed new fuel, to produce thermal energy and to create additional energetic reactions. This invention is directed to those TFRs utilizing external blankets (XBTFR) such as those disclosed in the commonly assigned U.S. Patent applications referred to above.

In the case where a TFR uses the deuterium-tritium (d,t) reaction, approximately 80% of the energy output is in the form of the kinetic energy of fast neutrons. In the small machine referred to in the above-referenced U.S. patents, the TF coil is exposed to the flux. The neutron radiation damage and heat loads preclude the use of superconducting materials for the TF coils in this small machine design. Applicants have found that the materials used in the TF coils must have both high electrical conductivity to carry the high currents necessary to generate the TF and also high tensile strength to withstand the forces accompanying the strong magnetic fields. Applicants have found that TF coils of high electrical conductivity can be made from high strength copper alloys. However inasmuch as in the small TFR design, the TF coil surrounds the plasma region, the neutrons created as a result of the fusion reactions must pass through it. In this regard, it has been found by Applicants that copper and copper alloy coils will absorb a considerable fraction of the neutrons and that those that do emerge without being absorbed in the TF coils will have lost much of their kinetic energy in the copper or copper alloy.

While it is a feature of the TFR design disclosed in the above-referenced U.S. patents to remove the energy deposited in the TF coils and recover it as useful heat, energetic neutrons are far too valuable for breeding fuel for fusion and fission reactors and for generating high temperature heat in the blanket to be used merely as a source of low temperature heat in the TF coils.

Applicants have also found that one of the consequences of the TFR geometry is that the current density and mechanical stresses imposed on the TF coils are much greater in the region of the inner part of the TF coil, the region nearest the center or the main axis of the machine. Another consequence of the XBTFR geometry is that most of the neutrons generated in the fusion plasma exit through the outer part of the TF coil or the region farthest from the central or main axis of the TFR.

SUMMARY OF THE INVENTION

Accordingly, it is an object of the present invention to provide an improved magnetic coil structure.

It is also an object of this invention to provide a magnetic coil structure that has high electrical conductivity and high strength.

It is a further object of this invention to provide an improved TF coil winding for TFRs.

It is also an object of this invention to provide improved TF coil windings for XBTFRs that have high strength and high electrical conductivity.

It is a still further object of this invention to provide improved TF coil windings for XBTFRs that have high strength and high electrical conductivity and which absorb relatively few energetic neutrons passing through the TF coils.

It is a still further object of this invention to provide improved TF coil design for XBTFRs that utilize aluminum or aluminum alloys wherever possible to provide improved neutron economy, reduced TF coil nuclear heating and heating gradients and reduced activation.

It is a still further object of the instant invention to provide an improved TF coil design for XBTFRs that shift the nuclear heating load from the magnets, coils and supporting structures to the surrounding media (e.g., blankets).

To achieve the foregoing and other objects in accordance with the principles of the present invention, there is provided a coil structure comprising at least two conductor segments, one segment made of copper or copper alloys and the other of aluminum or aluminum alloys. Preferably the conductor segments are joined at a high strength, high electrical conductivity joint. It is also preferred that the joint be constructed so as not to interfere with heat removal from the coil.

In a further aspect of the present invention, there is provided a coil structure for a TFR wherein the coil structure consists of a copper or copper alloy segment and an aluminum or aluminum alloy segment wherein the segments are joined at a high conductivity, high strength joint.

In a further aspect of the present invention, a TFR is provided for producing fusion reactions in a region generally adjacent to the TF coils which are exposed to the neutron flux. The TF coils, in accordance with the principles of the present invention, consist of a copper or copper alloy segment and an aluminum or aluminum alloy segment joined together at high conductivity, high strength joints. Preferably, the side of the TF coil nearest the center of the TFR is made of copper or copper alloy. This has been found to be the portion of the TF coil where the current density and the mechanical stresses imposed are the greatest. It is also preferred that the opposite side of the coils be made of aluminum or aluminum alloy. This has been found to be the region of the TF coils where the much larger fraction of the neutrons produced pass through the TF coils to the outside. It is also preferred that the joint be constructed to provide a generally smooth and continuous surface with the coil segments and be constructed so as not to interfere with heat removal from the TF coils.

It has been found by Applicants that aluminum has the advantage that energetic neutrons passing through it suffer very much less absorption and very much less energy loss than when they pass through copper. Another advantage of aluminum is that it is not activated by exposure to neutrons as much as copper and what radioactive elements are formed are shorter lived. The attendant waste disposal problem of an all copper TF coil is thereby eased. While the mechanical strength of aluminum and aluminum alloys may not provide an adequate strength margin for the inner portion of a TF coil, it is quite adequate for the outer part.

The much larger fraction of neutrons passing through the aluminum-copper composite coil of the present invention allow for more efficient use of the neutrons generated for breeding tritium fuel for fusion reactors, for breeding fissile fuel for fission reactors, for transmuting and fissioning fission reactor radioactive waste products and generally for all other purposes for which persons skilled in the art utilize neutrons.

The neutrons passing through the aluminum or aluminum alloy segment of the TF coil lose less of their kinetic energy making them more effective for the purposes disclosed hereinabove.

In addition, inasmuch as the neutrons passing through the aluminum or aluminum alloy sections of the TF coils result in less energy deposition in the TF coil than for the case of copper, the cooling system burden is reduced.

It is preferred that alloys of Cu and Al be utilized, rather than the pure metals in order to achieve necessary strength and other mechanical properties. In particular, copper beryllium, copper beryllium-nickel and MZC (Mg-Zr-Cr) alloys are preferred.

The most important consideration for the selection of the particular Al alloy is its mechanical strength. Preferably alloys in the 2000, 6000 and 7000 series are utilized due to their strength. Aluminum reinforced with graphite or carbon may also be used. It should be understood that lower strength Al alloys can be utilized in some of the lower stressed areas of the coils. It should be further understood that some alloying elements of aluminum (e.g., Fe and Ni) will result in increased activation compared to pure Al. However, the Al alloys still retain the property of being more transparent to neutrons than copper alloys, thus enhancing neutron economy by about the same magnitude as if pure Al were used.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings illustrate the present invention and together with the description and the rest of the specification, serve to explain the principles of the invention. In the drawings.

DETAILED DESCRIPTION OF THE INVENTION

Reference will now be made in detail to the present preferred embodiment of the invention, an example of which is illustrated in the accompanying drawing.

Figure 1A:
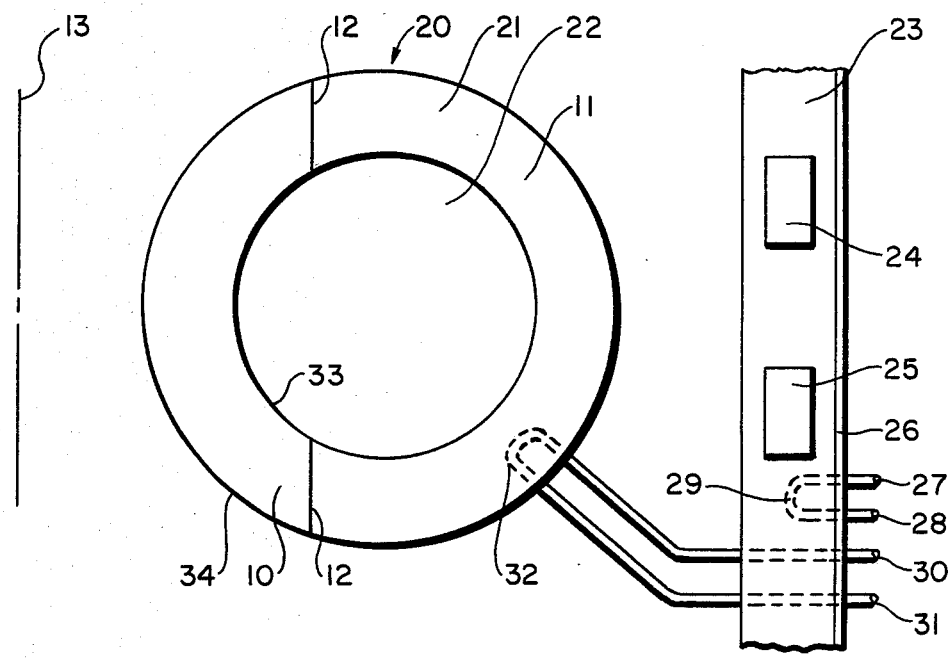
FIG. 1A is a plane view of a typical segmented coil winding.

FIG. 1A is a plane view of a typical segmented coil in accordance with the present invention. Segment 10 of the TF coil 21 is preferably made of copper or copper alloy and is located on the side of the TF coil closest to the main axis 13 of the TFR. Preferably, the segment 11 is made of aluminum or aluminum alloy and is located on the side of the TF coil furthest from the main axis 13 of the TFR. Region 22 in FIG. 1A is the toroidal plasma region The segments 10 and 11 of the coil 21 are joined at joint 12 which is more fully described in connection with FIGS. 2A-C, 3 and 4 below.

Figure 1B:
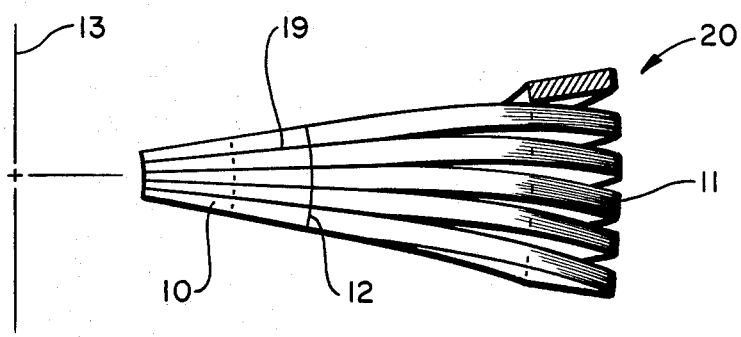
FIG. 1B is a partial top view of a plurality of coil windings.

As can best be appreciated from FIG. 1B, TF coil 21 is only one of a plurality of TF coils that together form the TF generating means 20. The TF coils 21 are insulated from each other with a layer of insulation 19. Preferably, in the region where the adjacent TF coils are in physical contact with each other, (on the side closest to the major axis of the TFR), the layer of insulation is the only material separating the adjacent TF coil windings.

It should be understood that in accordance with one aspect of this invention, the blanket means 23 and the shielding means 26 are positioned radially outside of the TF coils 21 from the plasma fusion region 22 and as will be appreciated by one of skill in the art, the blanket may contain a region 24 for breeding tritium as fuel for fusion reactors and/or a region 25 for breeding fissile fuel for fission reactors. The blanket means is also heated by nuclear heating caused by fusion neutrons from the fusion reactions which may occur in the fusion plasma region 22.

The blanket means is cooled with coolant from feed line 27, which passes through coolant channels 29 in the blanket and to the coolant return line 28. The TF coils are also cooled with coolant from feed line 30, through TF coolant channels 32 and to the coolant return line 31. Coolant means for the TF coils and blanket are well known in the art and do not form a part of the instant invention.

Applicants have found that the joints 12 between the coil segments 10 and 11 must preferably meet the following requirements:

1. Preferably, their mechanical strength in tension and their fatigue endurance must be as great or nearly as great, as that of the weaker of the two metals (aluminum in this case).

2. Preferably, their electrical resistance must be sufficiently small that they are not excessively heated by I²R losses.

3. Preferably, they must be sufficiently compact to fit the geometry of the XBTFR. More particularly, they must not protrude from the broad sides of the conductor segments or from the inner edge of the segments facing the plasma fusion region.

4. Preferably, they must not interfere with the removal of heat from the TF coils in their vicinity by the cooling system.

Applicants have found that the preferable types of joints that meet these requirements are mechanical joints and metallurgical joints. As will be apparent to one of skill in the art, the metallurgical joints may preferably include soldered joints, brazed joints, fusion welded joints or solid state bonded joints.

Preferably, in the case of a mechanical joint, the contact area of the joint is much larger than the cross-sectional area of the conductor segments so as to minimize the electrical resistance of the joint.

Figure 2A:
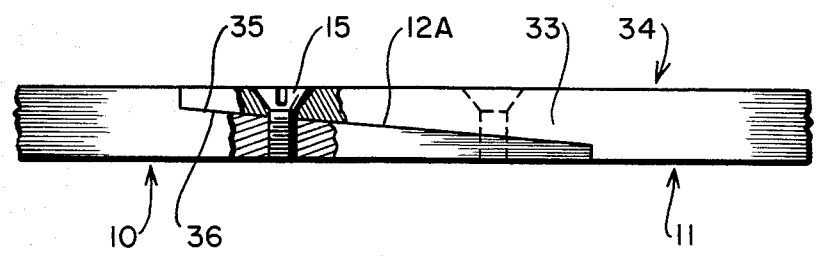
FIG. 2A is a partial plane view of a coil showing a coil segment joint in accordance with the present invention.
Figure 2B:
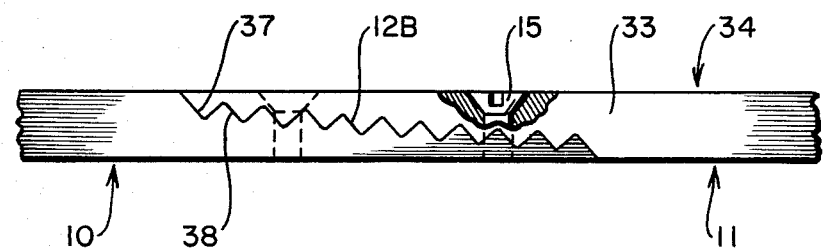
FIG. 2B is a partial plane view of a coil showing another embodiment of a coil segment joint in accordance with the present invention.
Figure 2C:
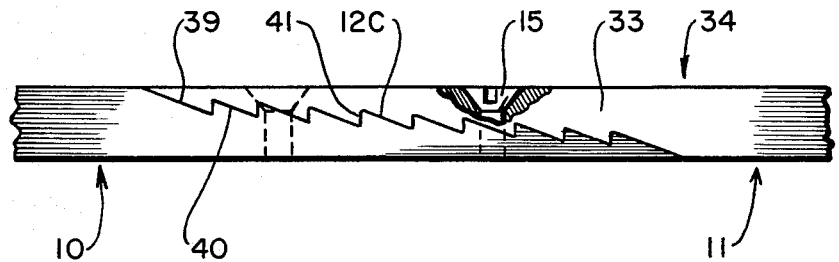
FIG. 2C is a plane partial view of a coil showing another embodiment of a coil segment joint in accordance with the present invention.
Figure 3:
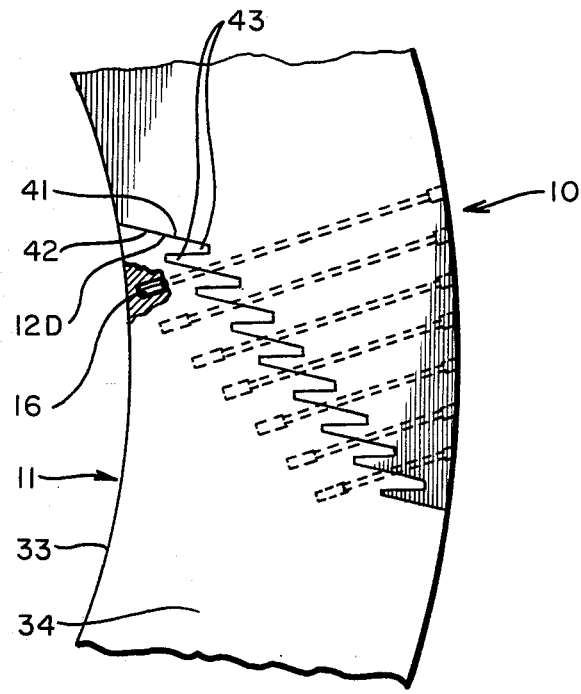
FIG. 3 is a plane partial view of a coil showing another embodiment of a coil segment joint in accordance with the present invention.
Figure 4:
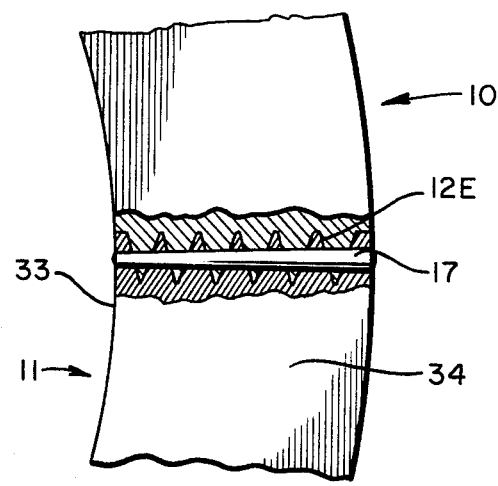
FIG. 4 is a plane partial view of a coil showing another embodiment of a coil segment joint in accordance with the present invention.

In accordance with the present invention, the joints can be formed parallel to the face 33 of the TF coils 21 as in FIGS. 2A–2C or they can be in the broad plane 34 of the TF coils 21 as shown in FIG. 3 and FIG. 4. It should be understood that any of the joints formed in accordance with the present invention can be formed either parallel to the face 33 of the TF coil 21 or in the broad plane 34 of the TF coil 21.

Preferably, one way to achieve the necessary mechanical joint is depicted in FIG. 2A. The joint consists of an angled lap joint 12A held together by one or more fastening means 15, preferably screws. An angled lap joint can alternately be formed in the broad plane 34 of the TF coil 21. This joint will, with sufficiently large clamping pressure, achieve the necessary low electrical resistance. The tensile stresses of the joint are transmitted by friction between the contacting surfaces 35 and 36 and by the shearing force on the fastening means 15.

Alternately, the facing surfaces 37 and 38 can be serrated as depicted in FIG. 2B with serrations formed of alternating positive and negative angular surfaces. Of course, it should be understood that the angles of the adjacent surfaces forming the serrations can be varied over any amount desired and the angle of the serration need not remain constant throughout the length of the joint. It should also be appreciated that adjacent legs along the serrated surface need not be of equal length but can be different. Preferably, however, the facing surfaces 37 and 38 are negative images of each other to provide good contact mating. In FIG. 2C a variation on the serrated surface of FIG. 2B is depicted wherein one side of each pair of angled surfaces forming the serrations has a portion 41 vertical to the broad plane of the TF coil 21 and an angled portion 40 that extends between consecutive vertical portions.

Preferably, the joints 12 should be located in a portion of the coil 21 where adjacent coils are separated only by a layer of insulation 18. In those locations the magnetic forces will act to compress the joint thereby reducing the number and size of the fasteners needed to provide the requisite compressive load.

It will be apparent to one skilled in the art that the serrated joints described above and depicted in FIGS. 2B and 2C can alternately be placed in the broad plane 34 of the conductors.

As depicted in FIGS. 3 and 4, and as discussed above, the joints 12D (in FIG. 3) and 12E (in FIG. 4) may also preferably be positioned in the broad plane 34 of the coil winding as opposed to the joints illustrated in FIGS. 2A, 2B and 2C wherein the joints were positioned parallel to the winding face 33. In the embodiment of FIG. 3, the tensile load on the coil winding 21 is carried by the interlocking teeth 43, the fastening means 16 serving simply to hold the conductor portions in the correct relative orientation. The fastening means 16 may preferably constitute countersunk screw or bolt members that are configured so as not to protrude outside of the smooth contour of the TF coil 21. The contact force required for good electrical conductance is provided by the tensile force, transmitted as a compressive load, across the interlocking tooth surfaces 43.

Depicted in FIG. 4 is an alternate embodiment of the interlocking tooth joint. In the embodiment of FIG. 4, the joint is again positioned in the broad plane 34 of the TF coils and preferably is positioned so as to traverse the TF coil 21 generally along a radius of the coil. As a fastening means, a tapered pin 17 may be used, the pin tapering inward toward the inner face of the TF coil 21. In this embodiment, it will be understood by one of skill in the art, both the tensile and compressive contact load are carried by shearing forces in the tapered pin.

Several metallurgical fabrication processes may preferably be used to achieve suitable joints 12 for the TF coils 21. It has been found that suitable joints may be formed by one or more of the following processes: welding; including but not limited to gas-metal arc welding; gas-tungsten arc welding; plasma arc welding; shielded metal arc welding; electron beam or laser beam fusion welding; seam or flash resistance welding; bonding, including but not limited to pressure, diffusion, explosive, ultrasonic, magnetic, friction or roll bonding; soldering or brazing using filler metals.

In the case of a metallurgical joint, the electrical resistance of the joint will be no greater than that of the parent metals, thus as will be understood, it is not necessary for electrical conduction reasons that the joints have a large contact area. However, as will be readily appreciated by the artisan, a relatively small surface area joint may be mechanically weaker than the parent metals. Therefore, it is preferable to use a large area joint, such as the lap joint of FIG. 2A or such other large area joints as this description will suggest to the artisan, to spread the mechanical load over an area much larger than the cross-sections of the TF coil, thereby reducing the local stress on the joint. Of course, it should be understood that with a metallurgical joint, the fastening means, which may preferably be countersunk screws as illustrated in FIGS. 2A–2C, could be dispensed with. Of course, in the case of the large area interlocking tooth joint that utilizes a tapered pin such as that depicted in FIG. 4, the tapered pin could be eliminated if a metallurgical joint were formed.

The foregoing description of a preferred embodiment of the invention has been presented for purposes of illustration and description. It is not intended to be exhaustive or to limit the invention to the precise form disclosed, and obviously many modifictions and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A composite magnetic coil winding comprising at least two conductor segments, a first segment of said at least two conductor segments being made from a copper material and a second segment of said at least two conductor segments being made from an aluminum material, each of said conductor segments defining a circumferential portion of said coil winding and each of said segments being joined to an adjacent segment to form said coil winding.

2. The composite magnetic coil winding of claim 1, wherein said circumferential portions are joined at a high strength joint.

3. The composite magnetic coil winding of claim 2, wherein the joint has low electrical resistance.

4. The composite magnetic coil winding of claim 2 or 3, wherein said winding has a generally regular and continuous surface and said joint does not protrude from said surface.

5. The composite magnetic coil winding of claim 2 or 3, wherein said coil winding has means for removing heat from said coil winding and wherein said joint does not interfere with said heat removal means.

6. The composite magnetic coil winding of claim 2 or 3, wherein said joint is a mechanical joint.

7. The composite magnetic coil winding of claim 2 or 3, wherein said joint is a metallurgical joint.

8. The composite magnetic coil winding of claim 1, wherein the copper material is in the form of a copper alloy.

9. The composite magnetic coil winding of claim 1, wherein the aluminum material is in the form of an aluminum alloy.

10. The composite magnetic coil winding of claim 8, wherein the copper alloy is copper beryllium.

11. The composite magnetic coil winding of claim 8, wherein the copper alloy is copper berylliumnickel.

12. The composite magnetic coil winding of claim 8, wherein the copper alloy is a Mg-Zr-Cr copper alloy.

13. The composite magnetic coil winding of claim 9, wherein the aluminum alloy is from the 2000 series of aluminum alloys.

14. The composite magnetic coil winding of claim 9, wherein the aluminum alloy is from the 6000 series of aluminum alloys.

15. The composite magnetic coil winding of claim 9, wherein the aluminum alloy is from the 7000 series of aluminum alloys.

16. The composite magnetic coil winding of claim 9, wherein the aluminum alloy is reinforced with graphite.

17. A composite magnetic coil winding for a tokamak reactor comprising at least two conductor segments, a first segment of said at least two segments defining a first circumferential portion of said coil winding and comprising a copper material and a second segment of said at least two segments defining a second circumferential portion of said coil winding and comprising an aluminum material and wherein said segments are joined at a high strength, low electrical resistance joint.

18. The composite magnetic coil winding of claim 17, wherein said coil winding has a generally smooth and continuous surface and wherein said joint does not protrude from said surface.

19. The composite magnetic coil winding of claim 17, wherein said coil winding has means for removing heat from said coil winding and wherein said joint does not interfere with said heat removal means.

20. The composite magnetic coil winding of claim 17, wherein said joint is a mechanical joint.

21. The composite magnetic coil winding of claim 17, wherein said joint is a metallurgical joint.

22. The composite magnetic coil winding of claim 17, wherein said copper material is a copper alloy.

23. The composite magnetic coil winding of claim 17, wherein the Al material is an Al alloy.

24. A toroidal reactor for producing fusion reactions, said reactor having a toroidal field generating means which are exposed to a neutron flux produced by said fusion reactions, said toroidal field means comprising at least one composite magnetic coil winding having at least two circumferential segments, a first of said at least two circumferential segments comprising a copper material and a second of said at least two circumferential segments comprising an aluminum material and wherein each of said circumferential segments are joined at a high strength, low electrical resistance joint to form said coil winding.

25. The toroidal reactor of claim 24, wherein said coil winding has a generally smooth and continuous surface and wherein said joint does not protrude from said surface.

26. The toroidal reactor of claim 24, wherein said toroidal field coil means further comprises heat removal means and wherein said joint does not interfere with said heat removal means.

27. The toroidal reactor of claim 24, wherein said joint is a mechanical joint.

28. The toroidal reactor of claim 24, wherein said joint is a metallurgical joint.

29. The toroidal reactor of claim 24, wherein said reactor has a main axis and wherein said copper field generating means nearest said main axis and said aluminum material segment is positioned on an opposite side of said toroidal field generating means, furthest from said main axis.

30. The toroidal reactor of claim 24, wherein said copper material is a copper alloy.

31. The toroidal reactor of claim 24, wherein the aluminum material is an aluminum alloy.

32. The toroidal reactor of claim 30, wherein the copper alloy is from the group consisting of copper beryllium and Mg-Zr-Cr-copper.

33. The toroidal reactor of claim 31, wherein the aluminum alloy is from the group consisting of the 2000, 6000 and 7000 series of aluminum alloys.

34. The toroidal reactor of claim 31, wherein aluminum alloy is reinforced with graphite.

35. A method of forming a composite field coil winding for a fusion reactor comprising:
providing a first circumferential coil segment made of a copper material;
providing a second circumferential coil segment made of an aluminum material;
joining said first and second circumferential coil segments at a relatively high strength, low electrical resistance joint to form a toroidal field coil winding.

36. A method of forming a composite field coil winding for a fusion reactor comprising:
providing a first circumferential coil segment made of a first electrically conductive material operable to conduct a first current density and having a first strength operable to support a first load;
providing a second circumferential coil segment made of a second electrically conductive material operable to support a second current density lower than said first current density and having a second strength operable to support a load lower than said first load and having a relatively low neutron absorption cross section whereby neutrons can pass through said second circumferential coil segment more freely than through first circumferential coil segment; and joining said first and second circumferential coil segments at an electrically conductive joint having a strength at least equal to said second strength to form a toroidal field coil winding.

37. The method of claim 36 or 35 further including the step of positioning the first coil segment at a location of maximum stress and current density.

38. The method of claim 37 further including the step of positioning the second coil segment at a location of maximum neutron fluence to minimize neutron capture.

39. The method of claim 36 including the step of making the first coil segment from a copper material.

40. The method of claim 36 including the step of making the second coil segment from an aluminum material.

41. The method of claim 39 or 35, wherein the copper material is a copper alloy.

42. The method of claim 40 or 35, wherein the aluminum material is an aluminum alloy.

* * * * *